(12) United States Patent
Shibahara

(10) Patent No.: US 6,459,468 B2
(45) Date of Patent: Oct. 1, 2002

(54) LCD HAVING PARTICULAR SPACING BETWEEN SPACERS

(75) Inventor: Hideo Shibahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/934,988

(22) Filed: Aug. 22, 2001

Related U.S. Application Data

(62) Division of application No. 09/552,647, filed on Apr. 19, 2000, now Pat. No. 6,317,188.

(30) Foreign Application Priority Data

Apr. 20, 1999 (JP) .......................... 10-112588

(51) Int. Cl.$^7$ ...................... C08F 1/1335; G02F 1/1339
(52) U.S. Cl. ......................... 349/155; 399/106
(58) Field of Search ................... 349/106, 155

(56) References Cited

U.S. PATENT DOCUMENTS

| | | | |
|---|---|---|---|
| 5,838,414 A | 11/1998 | Lee | 349/156 |
| 5,917,572 A | 6/1999 | Kurauchi et al. | 349/156 |
| 5,969,784 A * | 10/1999 | Miyazaki et al. | 349/106 |
| 6,040,888 A | 3/2000 | Masami et al. | 349/155 |
| 6,067,144 A | 5/2000 | Murouchi | 349/155 |
| 6,208,401 B1 * | 3/2001 | Wen et al. | 349/155 |

FOREIGN PATENT DOCUMENTS

| | | |
|---|---|---|
| JP | 57-100725 | 12/1980 |
| JP | 56-140324 | 11/1981 |
| JP | 8-262484 | 10/1996 |
| JP | 10-48636 | 2/1998 |
| JP | 2751392 | 2/1998 |
| JP | 10-82909 | 3/1998 |
| JP | 10-104606 | 4/1998 |
| JP | 10-186374 | 8/1998 |

\* cited by examiner

Primary Examiner—Toan Ton
(74) Attorney, Agent, or Firm—Scully, Scott, Murphy & Presser

(57) ABSTRACT

Spacers are disposed at only positions corresponding to positions of pixels of one of the color layers, thereby widening the spacing at which the substrates are supported, the planar spacing between the spacers being widened to 5 pixels in the horizontal direction and 3 pixels in the vertical direction, thereby causing the substrates to flex so as to track a dimensional change in the gap that accompanies a temperature change in the liquid crystal between the substrates.

2 Claims, 9 Drawing Sheets

LCD HAVING PARTICULAR SPACING BETWEEN SPACERS

CROSS REFERENCE TO RELATED APPLICATIONS

The present application is a divisional of Ser. No. 09/552,647 filed on Apr. 19, 2000, now U.S. Pat. No. 6,317,188.

FIELD OF THE INVENTION

The present invention relates to a liquid-crystal display device having a gap between two substrates and then sealing a liquid crystal into the gap, after which the gap is sealed.

BACKGROUND OF THE INVENTION

In recent years, the light weight, thinness, and low power consumption of LCDs has resulted in their use in a variety of information products and terminals and in video equipment, and a large part of the LCDs used in such applications are LCD types such as TN (twisted nematic) and STN (super twisted nematic) LCDs.

While the above-noted types of LCDs have been developed for practical use, because they have the problem of a relatively narrow viewing angle, an in-plane switching (IPS) type of LCD having a parallel electrical field has been proposed as an alternate.

IPS LCDs are formed by a substrate onto which opposing comb-shaped electrodes are formed, a substrate onto which electrodes are not formed, and a liquid crystal that is sealed between these two substrates.

More specifically, as shown in the example of FIG. 10, a gap is formed between a transparent TFT substrate 6 of glass, for example, and a color filter (CF) substrate 13, the periphery thereof being sealed with a sealant, and a liquid crystal 10 being sealed within the gap d between the TFT substrate 6 and the CF substrate 13.

A pair of comb-shaped common electrodes 2 and pixel electrodes 3 are formed on an inner surface of the TFT substrate 6, with no electrodes formed on the other (CF) substrate 13.

An orientation film 9 is formed on the inner surface of each of the TFT substrate 6 and CF substrate 13, these orientation films, as shown in FIG. 5, have had oriented (by rubbing) at an angle θ1, θ2, respectively for the direction Θ3, which is perpendicular to the teeth of the common electrodes 2 and the pixel electrodes 3.

Polarizers 19 are disposed on the outer surfaces of the TFT substrate 6 and the CF substrate 13, the polarization direction of one of the polarizers being the same as the orientation angle θ1, while the polarization direction of the other polarizer is at an angle θ2, which is perpendicular to the orientation direction θ1.

As shown in FIG. 6(a), with no voltage applied between the common electrodes 2 and the pixel electrodes 3, incident light is changed to linearly polarized light by the polarizer 19 on the incident side and, because the polarization direction coincides with the long-axis direction of the liquid-crystal molecules 22, the light passes through the liquid crystal without a change in the polarization direction, so that the polarization direction of light reaching the light-exiting side polarizer 19 is perpendicular to the polarization direction of that polarizer, and therefore the light is blocked.

As shown in FIG. 6(b), when a voltage is applied between the common electrodes 2 and the pixel electrodes 3, an electrical field created between the common electrodes 2 and the pixel electrodes 3 bends the long-axis direction of the liquid-crystal molecules to a direction that is perpendicular to the longitudinal direction of the electrode teeth.

Because of the above action, light which is changed to linearly polarized light by the polarizer 19 is changed during its travel through the liquid crystal 10 to elliptically polarized light by the effect of the refractive index of the liquid crystal 10, and then passes through the polarizer 19.

One method of displaying an image on an LCD such as described above is that, by providing the common electrodes 2 and the pixel electrodes 3 for each pixel, using one of the electrodes as a scanning electrode and the other electrode as a signal electrode, thereby creating a display in the same manner as was done in a simple matrix (XY matrix) LCD in the past.

Another method is similar to that of a TFT (thin-film transistor) active matrix LCD (hereinafter called an AM-LCD) of the past, in which common electrodes 2 and pixel electrodes 3 and a TFT as a switching element are formed on the inner surface of the TFT substrate 6 for each pixel, so as to selectively display each pixel.

In the case of an AM-LCD, there are cases in which, instead of a three-terminal switching element such as a TFT, a two-terminal switching element such as a diode or varistor or the like is provided.

Because the viewing angle of an IPS type LCD is wide, the demand for these devices is increasing for use in replacing CRT displays used in the past.

In a TN-mode or IPS-mode color liquid-crystal display element such as used in the past, in order to hold the thickness (cell gap) of the liquid-crystal layer, a spacer 23 made of plastic beads or glass fiber was inserted between an electrode substrate 13 having TFTs or a plurality of scanning electrodes and a color filter side substrate 6, thereby establishing a gap for sealing of a liquid crystal 10 between the substrates 6 and 13.

Because the spacers 23, made of plastic beads or the like, is applied over the top of the substrate, the positions of the beads, for example, between the electrode substrate 13 and the color filter side substrate 6 was indeterminate, because of scattering of light by a spacer 23 positioned above a pixel, there was the problem of a reduction in the display quality of the liquid-crystal display element.

Additionally, because the spacers that are applied to the liquid-crystal display element has spherical or bar-shaped pieces, when forming the cell, because of point or line contact with the cell, there is the problem of imparting damage to the orientation film or the transparent electrodes, thereby leading a tendency for display defects to appear.

Because of the damage to the orientation film or transparent electrodes, the liquid crystal becomes contaminated, and, because a process step that applies the spacers uniformly is required, or it is necessary to accurately control the spacer particle distribution, there is the problem that it is difficult with a simple method to achieve a liquid-crystal display element having stable display quality.

Given the above situation, there was proposed, in Japanese Patent No. 2751392 and Japanese Unexamined Patent Publication (KOKAI) No. 10-104606 and 8-262484, a liquid-crystal display device that uses as a spacer a structure formed by the overlaying of colored layers that form color filters.

Because the spacer formed in the above-noted structure does not require the additional processes to fabricating color filters, it enables the fabrication of a color filter at the same cost as in the past, and is expected to gain usage in the future.

In addition to the above technology, a method of forming a spacer was disclosed in Japanese Unexamined Patent Publication (KOKAI) No. 10-82909, whereby a separate spacer was formed on a color filter having the same structure as in the past. In this case, the method used for forming the spacer was that, for example, of patterning an overcoating layer.

In the above-noted method, because it is necessary to add a process step, the cost is higher than in the past. If a color filter having such a spacer is used in a liquid-crystal display device, in a TN-mode liquid-crystal display device, to prevent the transparent electrode in the part of the spacer butted up against the opposing substrate from creating a short circuit with the opposing substrate electrode, it is necessary to form an insulation film on either the opposing substrate or the spacer top part, and further a need to limit the formation position and size of the spacer, thereby making the fabrication of the color filter difficult.

In and IPS-mode liquid-crystal display device, because the opposing substrate has no electrodes formed thereon, there is no limit to the formation position and size of the spacer, so that compared to a TN-mode liquid-crystal display device, the degree of design freedom is large.

FIG. 11 is a plan view showing a color filter having a spacer in an IPS-mode liquid-crystal display device according to the prior art.

In FIG. 11, the reference numeral 24 denotes a spacer that forms a gap between a pair of substrates, and the reference numerals 25, 26, and 27 are red color filter, green color filter, blue color filter, respectively.

As shown in FIG. 11, in an IPS-mode LCD of the past, the color layers 25, 26, and 27 are arranged with colored layers of the same color in a vertically oriented line,.and the color layers 25, 26, and 27 are arranged in a prescribed sequence in the horizontal direction. A spacer 24 is disposed for each green color layer 26, the spacers 24 supporting the substrate and forming a gap between the pair of substrates, between which liquid crystal will be sealed.

In an IPS-mode LCD described above according to the prior art, the spacers 24 are arranged every two pitches in the horizontal direction and every 1 pitch in the vertical direction, forming a tightly packed arrangement, in which the positions at which the substrate is supported by adjacent spacers 24 are in close proximity to one another.

Although the TFT substrate and CF substrate 13 flex in accordance with the changes in the dimensions of the gap caused by thermal expansion and contraction due to changes in the temperature of the liquid crystal 10, because there are a plurality of columnar-shaped spacers 24 as noted above supporting the substrate, the flexures of the TFT substrate 6 and the CF substrate 13 are restricted, leading to the occurrence of a defect in which a gap is formed between the substrates 6 and 13 and the liquid crystal 10 surface. This phenomenon is known as liquid crystal bubbles and, in a liquid-crystal display device having normally closed characteristics, it manifests itself as black display defects, thereby lowering the display quality.

Accordingly, it is an object of the present invention to provide a liquid-crystal display device that solves the above-mentioned problem of liquid crystal bubbles.

SUMMARY OF THE INVENTION

In order to achieve the above-noted object, a liquid-crystal display device according to the present invention is one in which a liquid crystal is sealed within a gap established by first spacers between a pair of opposing substrates, wherein a spacing between positions at which the first spacers support said substrates is widened, so that the substrates flex so as to track a dimensional change in the gap caused by a temperature change in the liquid crystal.

In the second aspect of the present invention, of pixels of three colors, the spacers are disposed at positions corresponding to pixels of one color, thereby widening the spacing between positions at which the first spacers support the substrates.

In the third aspect of the present invention, a second spacers having a height that is shorter than the first spacers are provided between the first spacers, the substrate having flexed to track a dimensional change in the gap accompanying a temperature change in the liquid crystal is supported by the second spacers at a height shorter than that of the first spacers, thereby establishing a uniform gap between the substrates.

DESCRIPTION OF THE PREFERRED EMBODIMENTS

Embodiments of the present invention are described in detail below, with reference made to relevant accompanying drawings.

Figure 1:
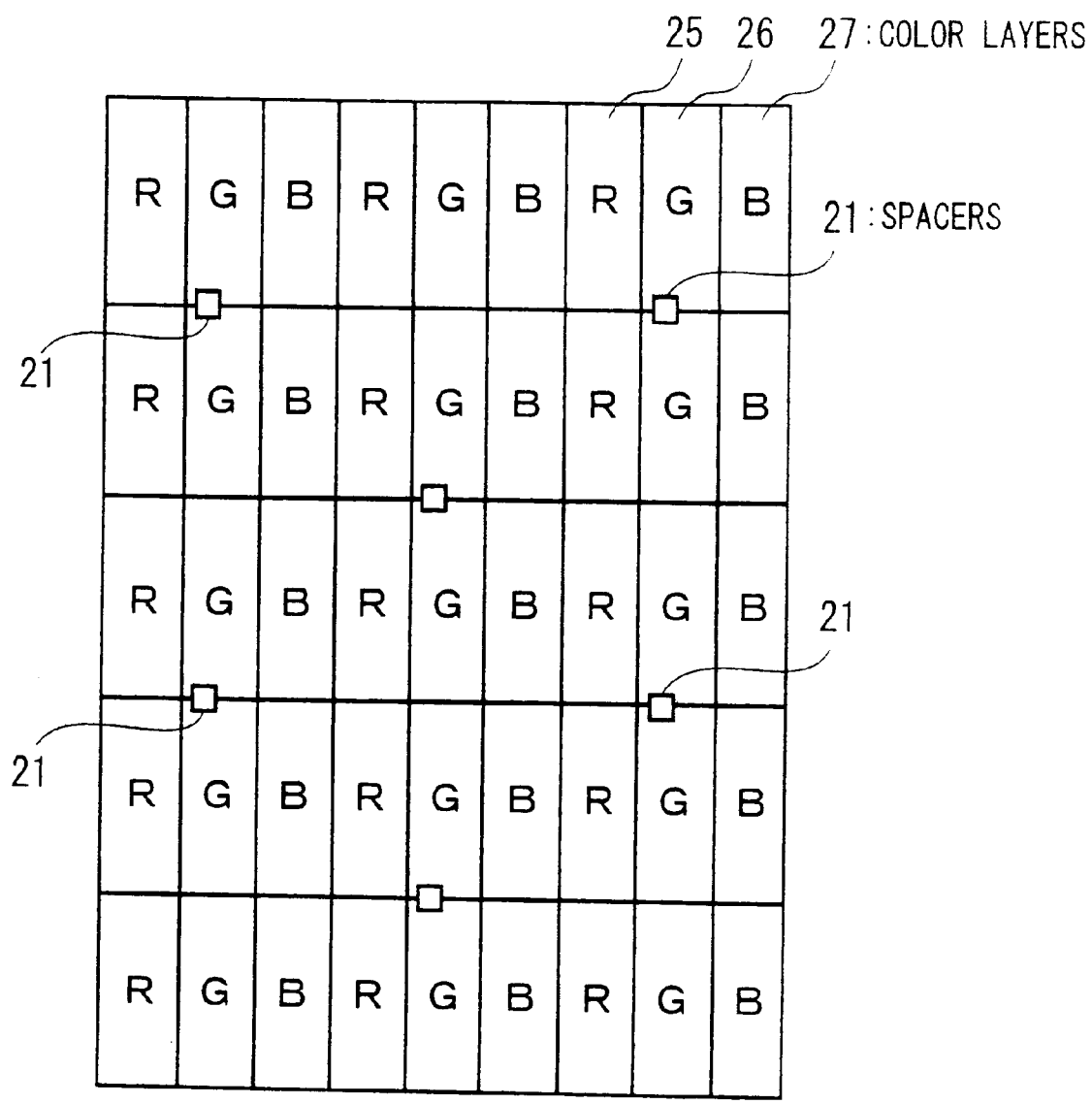
FIG. 1 is a plan view showing a CF substrate used in a parallel field type of active matrix liquid-crystal display device according to the first embodiment of the present invention.
Figure 3:
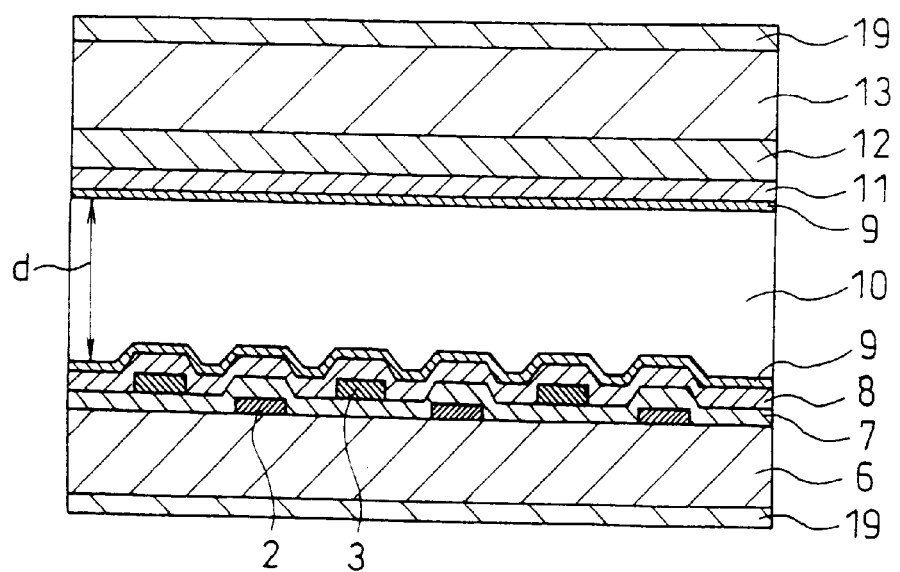
FIG. 3 is a cross-section view along the direction indicated as 3—3' in FIG. 2.
Figure 4:
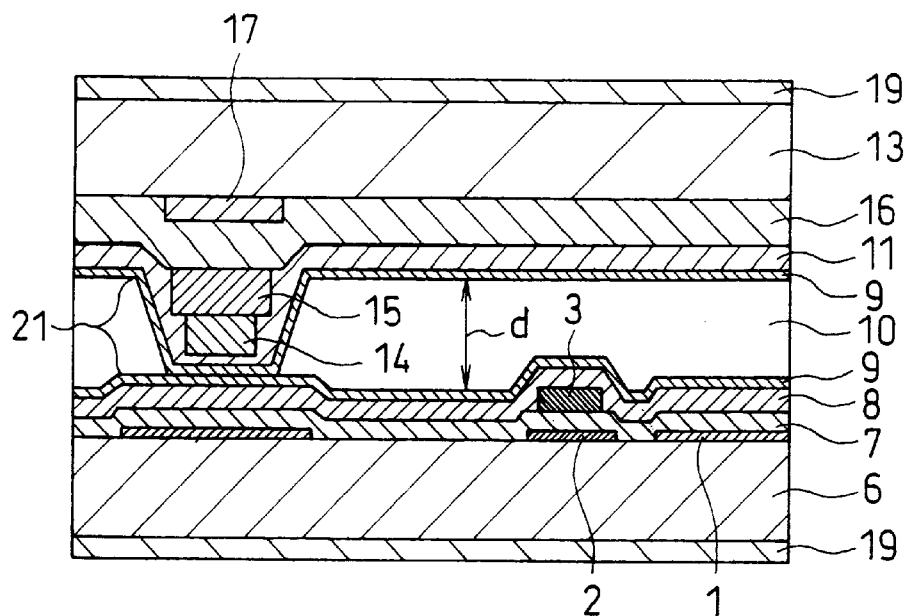
FIG. 4 is a cross-section view along the direction indicated as 4—4' in FIG. 2.

FIG. 1 is a plan view that shows a CF substrate used in a parallel field type of active matrix liquid-crystal display device according to the first embodiment of the present invention. FIG. 1 is a plan view showing an example of an electrode structure within a unit pixel in a TFT substrate that forms a pair of substrates with the CF substrate of FIG. 1. FIG. 3 is a cross-section view along the direction indicated as 3—3' in FIG. 2. FIG. 4 is a cross-section view along the direction indicated as 4—4' in FIG. 2.

Figure 2:
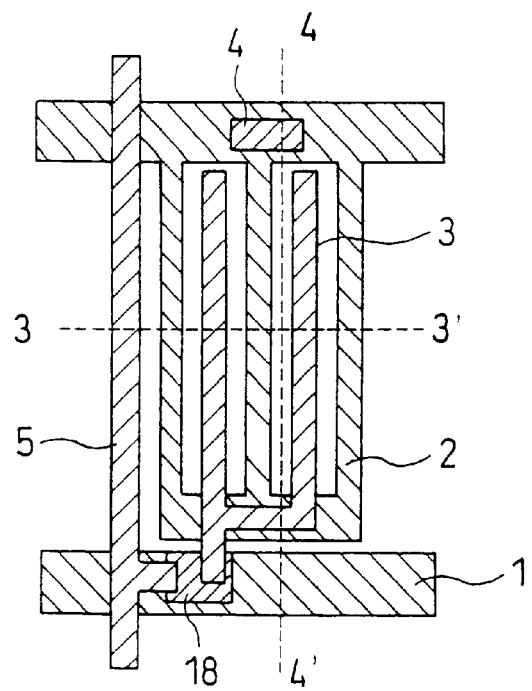
FIG. 2 is a plan view showing an arrangement of electrodes within a unit pixel in a TFT substrate that forms a pair of substrates with a CF substrate shown in FIG. 1.

In FIG. 2, the reference numeral 1 denotes a gate electrode (scanning signal electrode), 2 is a common electrode, 3 is a pixel electrode (source electrode), 4 is a columnar-shaped spacer contact part, 5 is a drain electrode (video signal electrode), and 18 is a TFT (thin-film transistor).

The common electrode 2, gate electrode 1, drain electrode 5 and pixel electrode 3 shown in FIG. 2 are each formed by patterning different metal layers.

A capacitive storage element is formed by a structure in which a gate insulation film 7 is sandwiched between the pixel electrode 3 and the common electrode 3.

The pixel electrode 3 within the unit pixel shown in FIG. 2 is formed as two teeth of a comb, and each pixel electrode 3 is disposed at a position between two common electrodes.

As shown in FIG. 1, FIG. 3, and FIG. 4, the pitch of the three colors of pixels is established as 100 $\mu$m in the horizontal direction (that is, the pitch between drain electrode interconnects 5 in FIG. 2) and 300 $\mu$m in the vertical direction (that is, the pitch between gate electrode interconnects 1 with the unit pixels shown in FIG. 2).

As shown in FIG. 2, the width dimension of the gate electrode 1, the drain electrode 5, and a portion connecting a plurality of teeth of the comb of the common electrode 2 within the unit pixel shown in FIG. 2 (part extending in a direction parallel to the gate electrode 1 (horizontal direction in FIG. 1)) is established as wider, so as to avoid line defects. The width dimensions of the gate electrode 1, drain electrode 5, and the portion connecting a plurality of teeth of the comb of the common electrode 2 are 10 $\mu$m, 7 $\mu$m and 7 $\mu$m respectively.

As shown in FIG. 2, the pixel electrode 3 formed independently within a unit pixel and the common electrode 2 have parts that extend in the longitudinal direction with a slightly reduced width, the widths being 4 $\mu$m and 5 $\mu$m, respectively.

By making the width of the pixel electrode 3 and the signal electrode of the common electrode 2 narrow, although the possibility of a broken connection caused by the intrusion of foreign matter increases, if this occurs the only damage is a partial loss of a unit pixel, and not a line defect.

A gate electrode insulation film 7 is disposed between the pixel electrode 3 and the common electrode 2, so that a gap of 10 $\mu$m is provided via the gate insulation film between the pixel electrode 3 and the common electrode 2.

With 1024×3 (R, G, and B) signal line electrodes and 768 scanning line electrodes, the number of pixels is 1024×3× 768. It should be understood that the above-noted dimensions are not to be interpreted as imposing dimensional restrictions.

In a parallel field type active matrix liquid-crystal display device according to the first embodiment of the present invention, as shown in FIG. 4, two transparent polished glass substrates having a thickness of 1.1 mm are used as the TFT substrate 6 and the CF substrate 13, with a liquid crystal 10 sealed therebetween.

Of the two substrates, a thin-film transistor 18 is formed on the TFT substrate 6, over the outermost surface of which is formed a silicon nitride film (protective film) as an insulation film, and further over which is applied an orientation film 9.

The material used for the orientation film 9 can be, for example, a polyimide, the surface of which is subjected to rubbing so as to impart orientation to the liquid crystal.

On the CF substrate 13 are formed a black matrix layer 17 which provides total cutoff of light in areas other than the display area, and color filters (red, blue, and green color layers 14, 15, and 16; the green layer 16 is shown in FIG. 3). Over the color layers 14, 15, and 16 is formed an overcoating 11 for preventing the dissolving out of impurities from the color layers 14, 15, and 16, and over the outermost surface thereof is further applied polyimide as an orientation film 9, which is subjected to the above-noted rubbing treatment.

Figure 5:
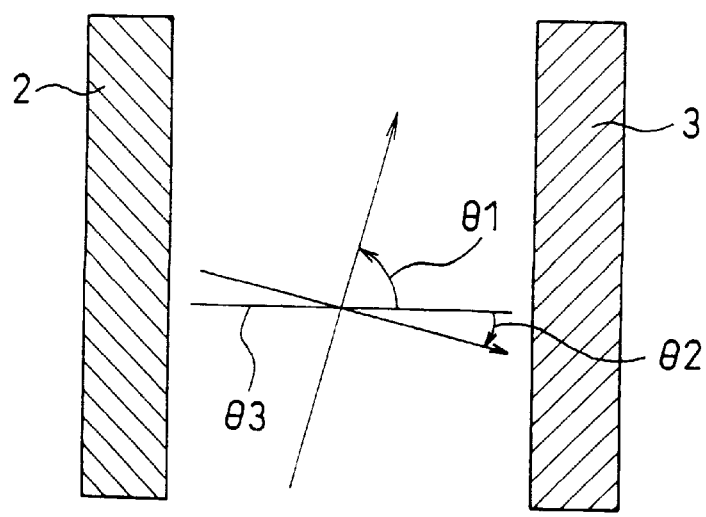
FIG. 5 is a drawing illustrating the rubbing direction on the orientation film.

The direction of rubbing of the orientation films 9 at the boundaries between the liquid crystal 10 and the TFT substrate 6 onto which are formed active matrix liquid-crystal display elements, and the CF substrate 13 on which is formed the color filters with the black matrix are substantially mutually parallel and, as shown in FIG. 5, the rubbing direction $\theta 1$ made with the direction $\theta 3$ of the applied electrical field is set to 75°.

A nematic liquid crystal having a positive dielectric constant anisotropy $\Delta \in$ of 7.3, and a refractive index anisotropy $\Delta n$ of 0.74 (at 589 nm and 20° C.) is sandwiched between the substrates 6 and 13, thereby forming a liquid-crystal panel.

In the above case, the gap d between the substrates 6 and 13 is maintained by the columnar-shaped spacers 21 formed by the stacking of materials of the green, blue, and red layers 16, 15, and 14 on the black matrix layer 17 of the CF substrate 13, this being 4.0 $\mu$m with the liquid crystal trapped therebetween.

The positions at which the tops of the columnar-shaped spacers 21 come into contact with the TFT substrate 6 are established as the columnar-shaped spacer contact parts on the common electrodes 2 shown in FIG. 2.

While the spacers 21 formed on the color filters shown in FIG. 3 and FIG. 4 are formed by the stacking of the materials of the color layers 14, 15, and 16 that make up the color filters, it is alternately possible to use a patterned overcoating 11, and further possible to establish the columnar-shaped spacer contact parts on the gate electrode.

A liquid-crystal display panel configured as described above is sandwiched between two polarizers 19.

The polarization transmission axis $\theta 1$ of one of the polarizers 19 is 75°, and the transmission axis $\theta 2$ of the other polarizer 19 is −15°, which is a direction perpendicular thereto.

FIG. 1 shows a plan view of the columnar-shaped spacers as installed on the CF substrate 13.

In FIG. 1, reference numeral 21 denotes columnar-shaped spacers, and 25, 26, and 27 are, respectively, the red layer (R), the green layer (G), and the blue layer (B) striped pattern.

The basic configuration of the present invention is one in which the spacing between the positions at which the substrates 6 and 13 are supported by the columnar-shaped spacers is widened, and wherein the substrates 6 and 13 flex so as to track the dimensional change of the gap d caused by a change in temperature in the liquid crystal 10.

Specifically, in the first embodiment, the spacing between positions at which the spacers support the substrates is widened.

In the example shown in FIG. 1, the spacers 21 are disposed at positions corresponding to the green layer (G), although it will be understood that the positions of the spacers can be alternately selected as the positions of other colors as well.

Figure 6:
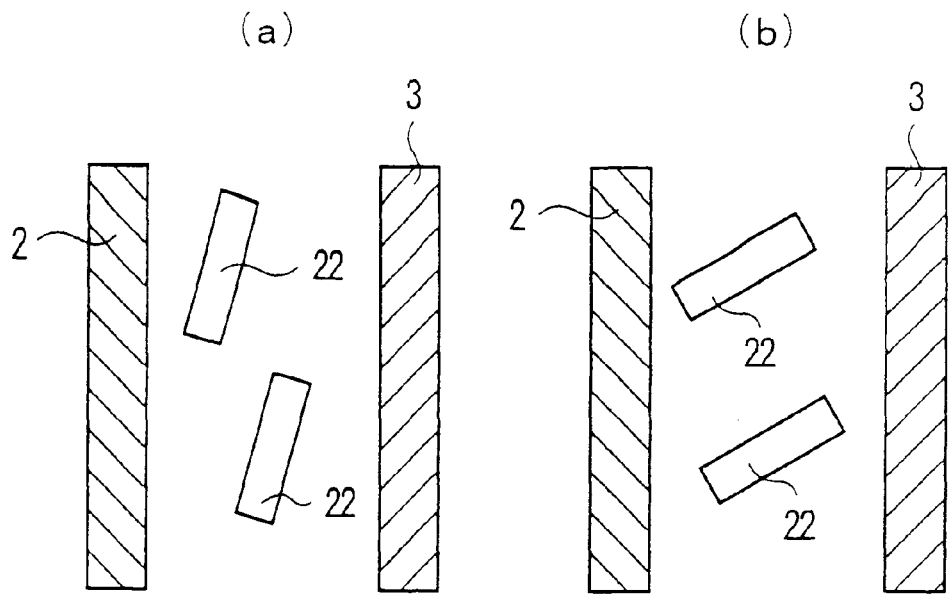
FIG. 6 is a drawing showing the oriented condition of a liquid crystal element.

In a liquid-crystal display device configured as described above, if normally closed characteristics, whereby a low voltage (VOFF) results in the dark condition and a high voltage (VON) results in the light condition, are adopted, the liquid crystal molecules 22 are oriented to create the light and dark conditions as shown in FIG. 6.

That is, in the case of the dark condition, the liquid crystal molecules 22 are oriented along the direction of rubbing, as shown in FIG. 6(a). The action of this orientation direction of liquid crystal molecules 22 and the two polarizers 19 is to control the display so as to be in the dark condition.

In the light condition, as shown in FIG. 6(b), the liquid crystal molecules are oriented by the applied voltage along a direction that is rotated by a certain angle with respect to the rubbing axis, thereby controlling the display so as to be in the light condition.

If a temperature change is imparted to the above-described liquid-crystal display device, because the liquid crystal 10 shown in FIG. 3 and FIG. 4 exhibits repeated thermal expansion and contraction, there is a change in the panel gap d between the TFT substrate 6 and the CF substrate 13.

For a panel having a panel gap d that is 4.0 $\mu$m at room temperature, the gap d would change to 3.9 $\mu$m at $-20°$ C. and change to 4.1 $\mu$m at 60° C.

Because the change in panel gap d over the range from $-20°$ C. to 60° C. is 0.2 $\mu$m, if the glass material of the TFT substrate 6 and the CF substrate 13 does not exhibit similar dimensional changes so as to track the changes in the gap d, a gap will be formed between the liquid crystal 10 and the TFT substrate 6, the CF substrate 13.

This problem is referred to as liquid crystal bubbles, and in a normally closed liquid-crystal panel, they manifest themselves as display defects appear as black regions.

The above selection of the temperature range from $-20°$ C. to 60° C. was done in consideration of the practical range of temperatures when using a liquid-crystal display device.

In the first embodiment of the present invention, as shown in FIG. 1, because the columnar-shaped spacers 21 are disposed only at the green color layer 26 of the three color of pixels (RGB), so as to widen the spacing therebetween, the planar spacing between columnar-shaped spacers 21 is widened to 5 pixels horizontally and 2 pixels vertically.

For this reason, the spacing between the columnar-shaped spacers 21 is larger than the case of the past, in which columnar-shaped spacers were positioned at each pixel, thereby increasing the freedom of the glass substrates 6 and 13 to flex, so that it is easier for the TFT substrates 6 and CF substrate 13 to flex so as to track to the dimensional change in the panel gap d caused by thermal expansion and thermal contraction of the liquid crystal 10.

Figure 7:
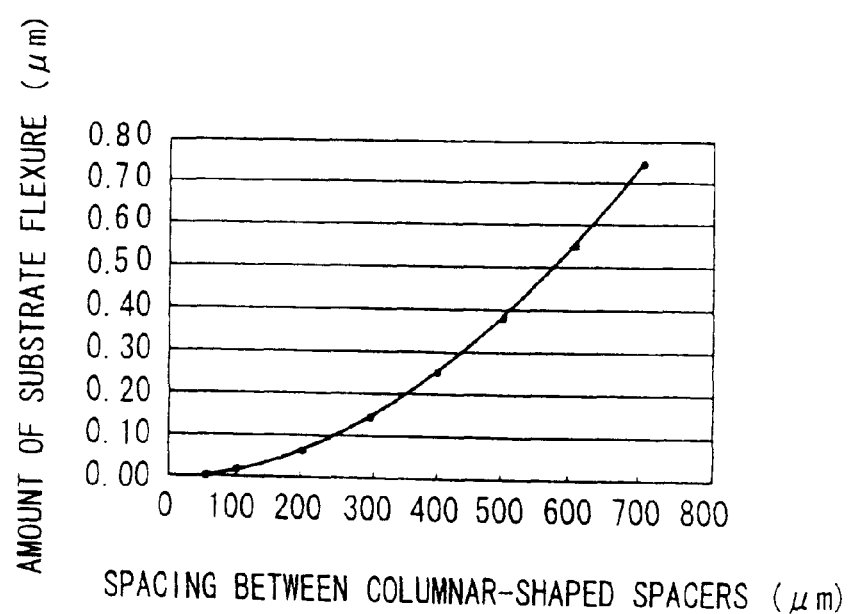
FIG. 7 is a drawing showing the relationship between the installation spacing of columnar-shaped spacers and the flexure of the substrate (glass).

FIG. 7 shows the relationship between the spacing between the columnar-shaped spacers 21 and the amount of flexure of the glass substrates 6 and 13. The pressure applied to the glass substrates 6 and 13 is set to be atmospheric pressure (105 N/m$^2$ As the spacing between the columnar-shaped spacers 21 is increased, the amount of flexure of the glass substrates 6 and 13 increases.

To prevent the occurrence of liquid crystal bubbles over the above-noted temperature variation range from $-20°$ C. to 60° C., it is necessary that the amount of substrate flexure be at least 2 $\mu$m.

For this reason, in FIG. 7 it is necessary to set the spacing between columnarshaped spacers 21 to at least 400 $\mu$m.

In this embodiment of the present invention, if the columnar-shaped spacers 21 are provided with a pixel spacing of 300 $\mu$m, by placing columnar-shaped spacers 21 at only the green positions of the three colors red, green, and blue so as to widen the spacing therebetween, the spacing between the columnar-shaped spacers becomes 600 $\mu$m, so that the amount of flexure of the glass substrates 6 and 13 is 0.55 $\mu$m, this being sufficient to prevent the occurrence of liquid crystal bubbles.

As is clear from FIG. 7, in order to prevent liquid crystal bubbles over the temperature variation range from $-20°$ C. to 60° C. when using columnar-shaped spacers 21 with a liquid-crystal display device having a pixel spacing of 300 $\mu$m or less, it is essential that the spacing of the columnar-shaped spacers 21 be made so as to widen the spacing.

Figure 8:
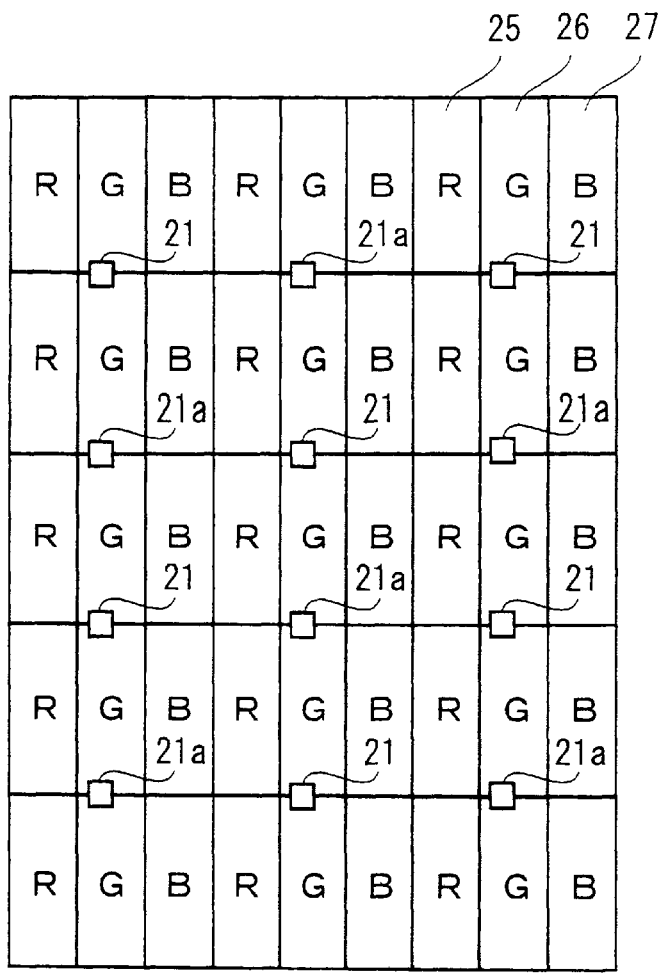
FIG. 8 is a drawing showing a second embodiment of the present invention.

FIG. 8 shows the second embodiment of the present invention.

In the second embodiment, second spacers 21a, which are shorter than first spacers 21 are disposed between position at which the substrates are supported by the first spacers 21, so that the substrates 6 and 13 that have flexed to track a dimensional change in the gap d that accompanies a temperature change in the liquid crystal 10 are supported by the second spacers 21a at a shorter height than that of the first spacers 21, thereby establishing a uniform gap d between the flexed substrates 6 and 13.

Figure 9:
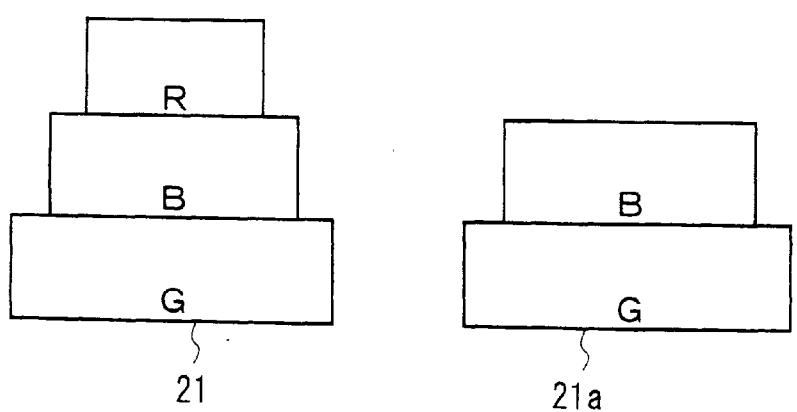
FIG. 9 is a cross-section view showing spacers in the second embodiment of the present invention.
Figure 10:
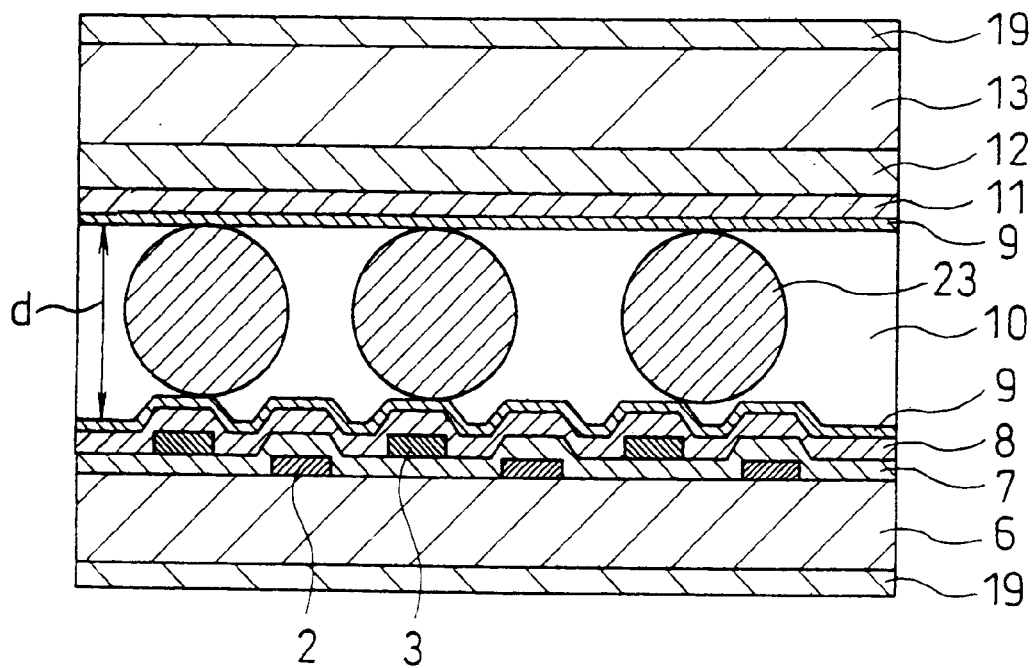
FIG. 10 is a cross-section view showing the prior art.
Figure 11:
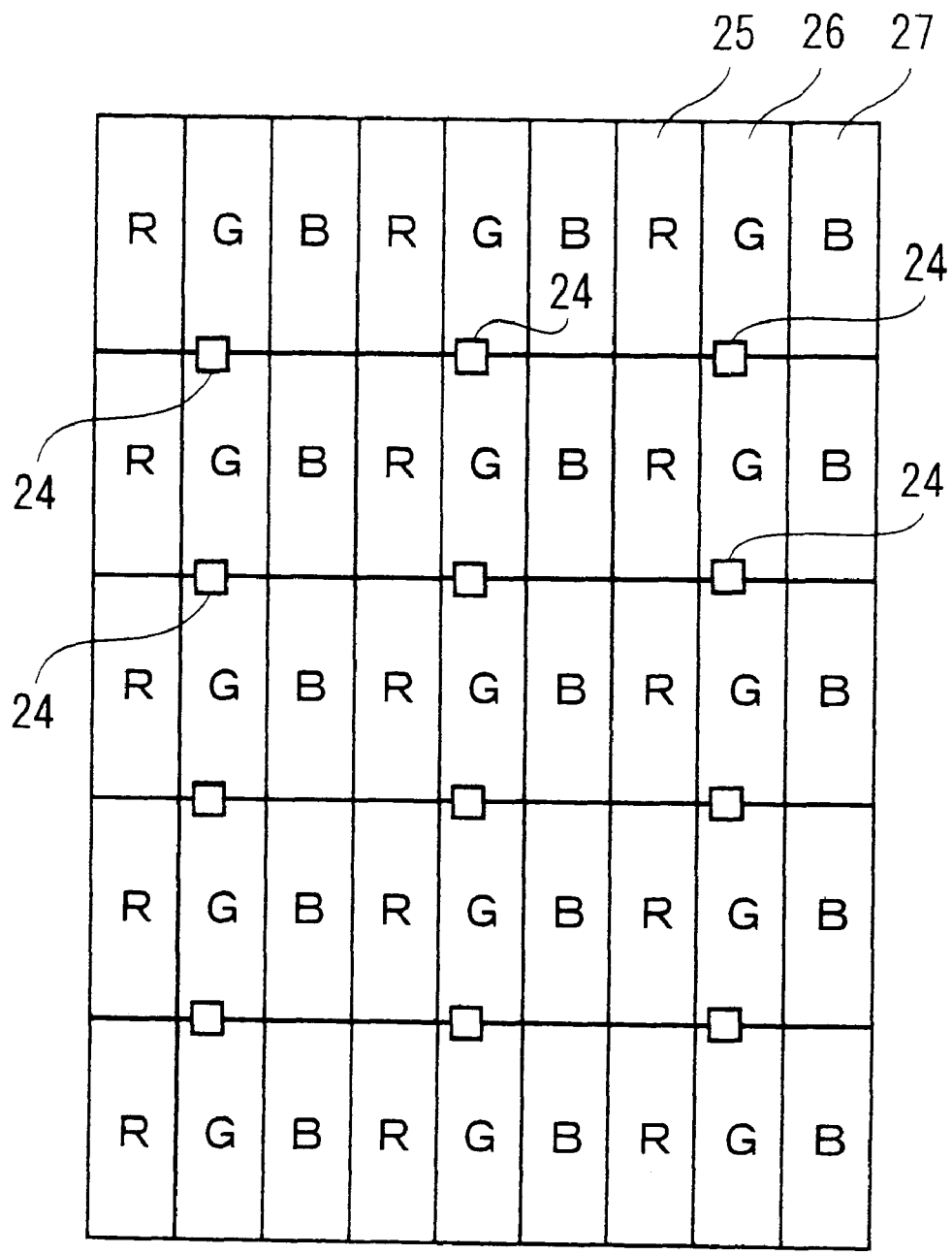
FIG. 11 is a plan view showing the prior art.

FIG. 9 is a cross-section view showing the spacers 21 and 21a of different heights. In FIG. 9, the black matrix layer 17 and overcoating 11 have been omitted.

The structure of the first spacer 21 is the same as described with regard to the first embodiment, this being formed by the stacking up of materials of the RGB color layers.

The second spacers 21a are formed by stacking the materials of only the RG color layers, and therefore the height of the second spacers 21a is shorter than the first spacers 21.

In the second embodiment of the present invention, the amount of flexure of the glass substrates is the same as in the first embodiment. In the second embodiment, however, because of the presence of the second shorter spacers 21a, the substrates 6 and 13 that have flexed so as to track the dimensional change in the gap d accompanying a temperature change in the liquid crystal are supported by the second spacers 21a at a height that is lower than the first spacers 21, thereby establishing a uniform gap d between the flexed substrates 6 and 13.

When the gap d is formed, because of interposed second spacers 21a, compared to the case in which there are no second spacers 21a, the gap d is prevented from becoming excessively narrow.

Figure 12:
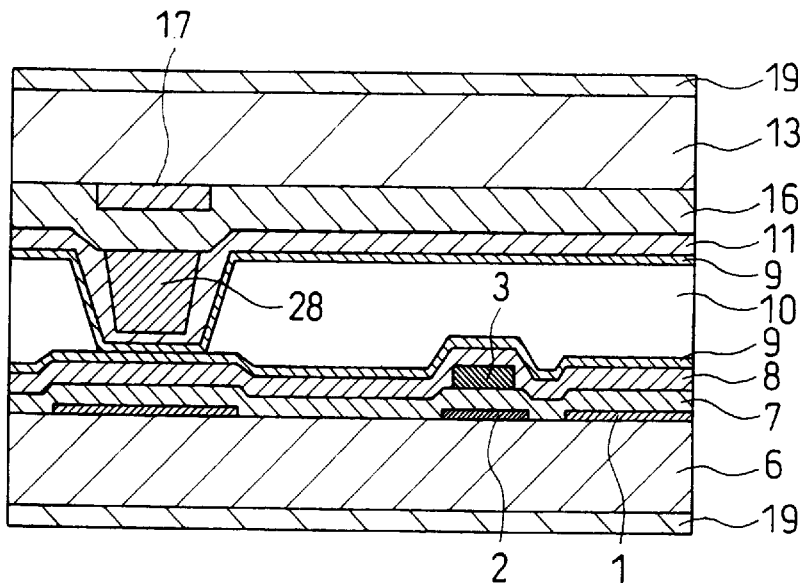
FIG. 12 is a cross-section view showing a third embodiment of the present invention.

FIG. 12 is a cross-section view showing the third embodiment of the present invention.

In the third embodiment, after forming the black matrix layer 17 and the color filter with the red, blue, and green layers (the green layer 16 being shown in FIG. 12), the spacer 28 is formed in the shape of a column, and an overcoating 11 is formed over the entire area so as to prevent the dissolving out of impurities from the color layers, over the outermost surface of which polyimide is applied as an orientation film 9.

The material of the spacer 28 can be the material of the color layers 14, 15, and 16, or the same material as the overcoating 11.

By using the spacers 28 of the third embodiment of the present invention, although there is an additional manufacturing step for forming the spacers 28, because the height of the spacers 28 can be arbitrarily set by adjusting the film thickness when growing the spacers 28, in contrast to the first and the second embodiments, the color layers are formed by a separate process step, making it possible to precisely control the thickness of the color films, thereby facilitating design.

Figure 13:
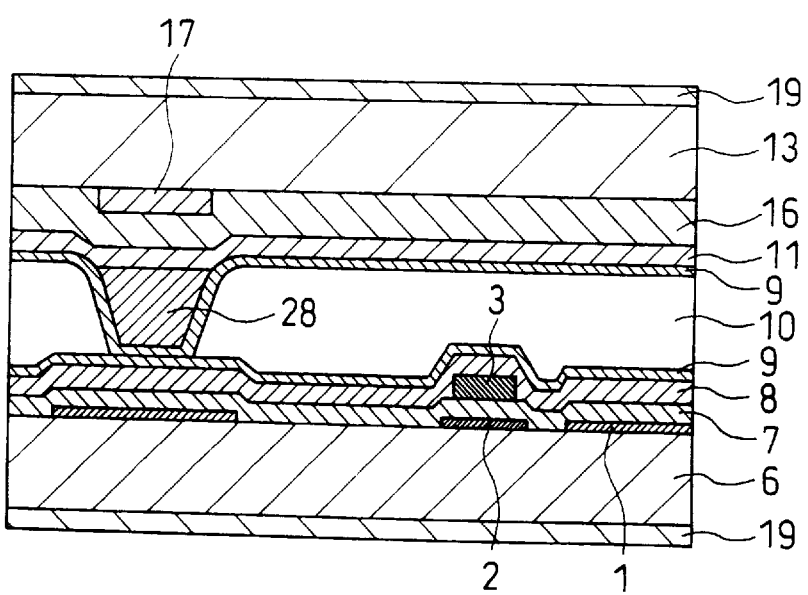
FIG. 13 is a cross-section view showing a fourth embodiment of the present invention.

FIG. 13 is a cross-section view showing the fourth embodiment of the present invention.

In the fourth embodiment, after forming the black matrix film 17 and the color filter with red, blue, and green layers (the green layer 16 being shown in FIG. 13), an overcoating 11 is formed, over which is formed the spacer 28, and further over the outermost surface of which polyimide is applied as an orientation film 9.

The material of the spacer 28 can be the material of the color layers 14, 15, and 16, or the same material as the overcoating 11.

By using the spacers 28 of the fourth embodiment of the present invention, although there is an additional manufacturing step for forming the spacers 28, because the height of the spacers 28 can be arbitrarily set by adjusting the film thickness when growing the spacers 28, in contrast to the first and the second embodiments, the color layers are formed by a separate process step, making it possible to precisely control the thickness of the color films, thereby facilitating design.

Figure 14:
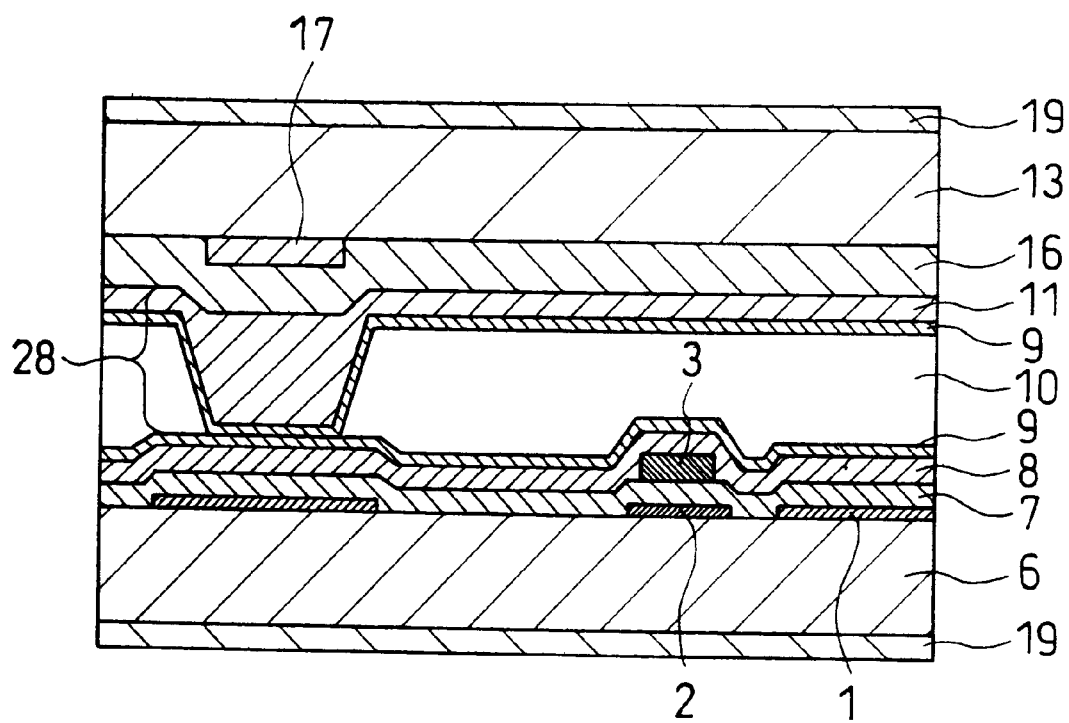
FIG. 14 is a cross-section view showing a fifth embodiment of the present invention.

FIG. 14 is a cross-section view showing the fifth embodiment of the present invention.

In the fifth embodiment, after forming the black matrix film 17 and the color filter with red, blue, and green layers (the green layer 16 being shown in FIG. 14), the color spacer 28 is formed by the overcoating 11.

The overcoating 11 is formed also in regions other than the spacer 28 for the purpose of preventing the dissolving out of impurities from the color layers, and over the outermost surface thereof polyimide is applied as an orientation film 9.

By using the spacers 28 of the fifth embodiment of the present invention, although there is an additional manufacturing step for forming the spacers 28, because the height of the spacers 28 can be arbitrarily set by adjusting the film thickness when growing the spacers 28, in contrast to the first and the second embodiments, the color layers are formed by a separate process step, making it possible to precisely control the thickness of the color films, thereby facilitating design.

By adopting the constitutions described in detail above, the present invention widens the spacing between the positions at which the spacers provide, thereby allowing the substrates to flex so as to track the dimensional changes in the gap caused by temperature changes in the liquid crystal, the result being the prevention of bubbles formed between the liquid crystal and the surfaces of the substrates.

What is claimed is:

1. A liquid-crystal display device in which a liquid crystal is sealed within a gap established by spacers formed between a pair of opposing substrates, wherein a plurality of spacers are arranged along a first boundary line formed between adjacently arranged pixels either in one of vertical and horizontal directions, with a predetermined distance interposed therebetween while a plurality of spacers are arranged along a second boundary line formed between adjacently arranged pixels in the same direction as that of said first boundary line, with the same distance as that established in said first boundary line, interposed therebetween, another plurality of spacers of said second boundary line are respectively located at a position so that said spacers of said second boundary line can be disposed at an intermediate position between said adjacently arranged spacers on said first boundary line, and, at said intermediate position formed between said adjacently arranged spacers established on said first boundary line, is provided at least one pixel of the same color as a pixel to which said spacer of said first boundary line is provided but without any of said spacers of said first boundary line.

2. A liquid-crystal display device according to claim 1, wherein each of red color filters, green color filters and blue color filters are respectively arranged with a stripe configuration in a predetermined direction on one of said substrates so as to form red pixels, green pixels, and blue pixels, respectively and said spacers formed between said pair of opposing substrates are located only in a region in which a color filter having one color selected from three colors each forming said red pixels, green pixels, and blue pixels.

* * * * *